J. I. & H. F. Mann.
Harvester Rake.
Nº 6540 Patented Jun. 19, 1849.
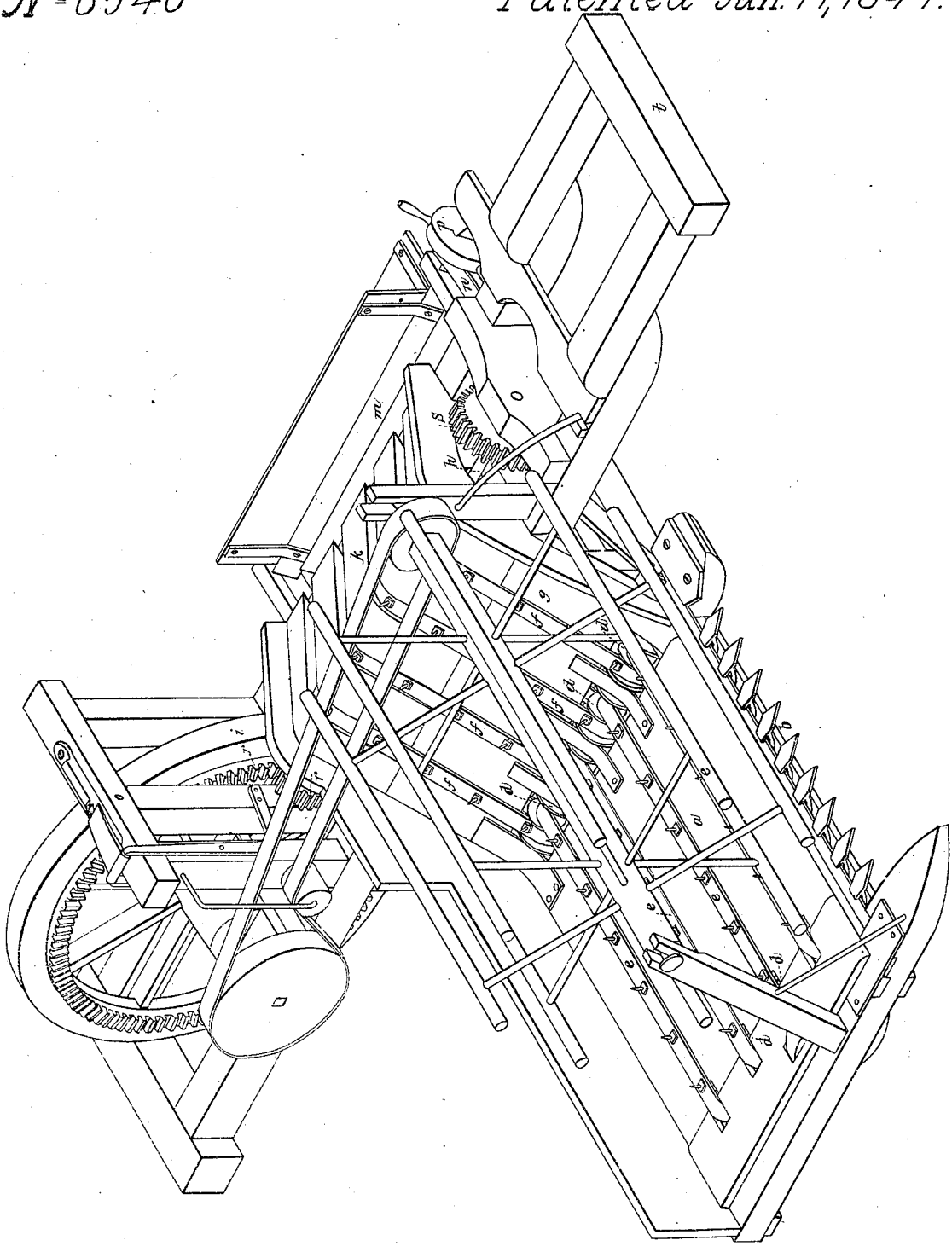

UNITED STATES PATENT OFFICE.

J. I. MANN AND H. F. MANN, OF CLINTON, INDIANA.

IMPROVEMENT IN GRAIN-CARRIERS FOR HARVESTING-MACHINES.

Specification forming part of Letters Patent No. 6,540, dated June 19, 1849.

*To all whom it may concern:*

Be it known that we, JACOB I. MANN and HENRY F. MANN, of Clinton, in the county of La Porte and State of Indiana, have invented certain new and useful Improvements in Conveying Straw and Grain from a Reaping-Machine; and we do hereby declare that the following is a full, clear, and exact description of the principle or character which distinguishes them from all other things before known, and of the usual manner of making, modifying, and using the same, reference being had to the accompanying drawing, which represents an isometrical view of the machine.

The nature of our invention consists in conveying the grain, after it is cut, from the reaping-machine in bundles in such a manner as to keep it straight and discharge it from the machine without scattering—a difficulty heretofore found insurmountable by machinery, as in all practical machines now employed—such as McCormick's and others—the grain has to be discharged with a rake by hand.

Our invention can be applied to any of the ordinary reaping-machines, and the one represented in the drawing is in most particulars like that known as McCormick's, with the exception of the straw or grain carrier, which is constructed in the following way: We place near each side of the platform $a$, just behind the cutter $b$, two shafts, having on them a series of pulleys, $d$, on which the endless bands $e$ are carried. These bands on their upper sides traverse on a level with the platform and in a lateral direction. They are armed at intervals with projecting pins or teeth, that stand up perpendicularly from their surface. Their number is sufficient to take hold of and carry to one side all the grain and straw that falls on the platform. The inner one of the two above-named shafts has double the number of pulleys upon it that the outer one has, and around each alternate pulley on this shaft there is a similar endless band to those on the platform $a$. These last-named bands $f$ are extended upward in an inclined direction to the top of the frame of the machine on that side, there being an inclined plane, $g$, under them, like the platform $a$. At their summit they pass around a series of larger pulleys on a shaft, $h$, and the plane $g$, following the curve of the pulleys and filling the space between them on their upper side, inclines down in the opposite direction at $k$ to the edge of the frame. Just below, at this point, there is a receiver, $m$, composed of a shaft in proper bearings affixed to the side of the frame, from which three (more or less) wings radiate, and form three triangular troughs, one of which is always up, ready to receive the straw from the inclined plane $k$. The shaft of this receiver, beyond the bearing at the front end, is made triangular, and a stout plate spring, $n$, bears upon it to hold the receiver in place. There is also on the same shaft a hand-wheel, $p$, by which the receiver is turned to discharge the load when sufficiently filled to make a bundle. The upper shaft, $h$, is connected with the driving-wheel $i$ by crown-gearing $r$, and conveys motion to the cutters by means of the spur-wheel $s$ in a manner similar to those machines now in use, a description of which is therefore omitted.

The machine to be used may have the fore wheels of a wagon attached to it at $t$, by which it is drawn.

Having thus fully described our improvements and their mode of operation, what we claim therein as new, and for which we desire to secure Letters Patent, is—

1. The employment, in combination, of a double series of endless bands, $e\ e$ and $f\ f$, constructed and arranged substantially in the manner and for the purpose set forth, by which the grain is raked and carried over one side of the machine, as described.

2. The receiver $m$ for collecting the grain into bundles and discharging it from the machine at once, in the manner hereinabove made known.

JACOB I. MANN.
H. F. MANN.

Witnesses:
ELIAS HORNER,
GEO. Y. THOMPSON.